Sept. 26, 1944.   G. H. GABLE   2,358,856
FORAGE ACRE FACTOR CALCULATOR
Filed Nov. 12, 1942   3 Sheets-Sheet 1

INVENTOR
G. H. GABLE
BY
ATTORNEYS

Sept. 26, 1944.  G. H. GABLE  2,358,856
FORAGE ACRE FACTOR CALCULATOR
Filed Nov. 12, 1942  3 Sheets-Sheet 2

INVENTOR
G. H. GABLE

BY

ATTORNEYS

Sept. 26, 1944.   G. H. GABLE   2,358,856
FORAGE ACRE FACTOR CALCULATOR
Filed Nov. 12, 1942   3 Sheets-Sheet 3

INVENTOR
G.H.GABLE
BY
ATTORNEYS

Patented Sept. 26, 1944

2,358,856

UNITED STATES PATENT OFFICE 2,358,856

FORAGE ACRE FACTOR CALCULATOR

George H. Gable, Grass Range, Mont., assignor to Claude R. Wickard, as Secretary of Agriculture of the United States of America, and his successors in office Application November 12, 1942, Serial No. 465,316

1 Claim. (Cl. 235—83)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to means for determining the forage acre factor of grazing lands.

The forage acre factor is a factor used in evaluating the land for forage purposes. From it is determined the head of livestock, for example, cattle, which the land per acre can properly support for a given length of time. It depends on the species of grasses present, each of which has its own forage value, on the relative percentage of the species present in a composition of grasses, known as the "composition of the species," and on the percentage of ground covered which is available for grazing, known as the "forage density." The forage value, known as the "proper use factor," has been determined to the nearest .10 for each of the species of grasses present on the graze lands. It depends, to a large extent, on the palatability of the particular species, since grazing cattle tend to select the grasses more tasty to them. It also depends on the amount of the species which properly can be eaten or used in a season without destruction or serious interference with the growth of the species.

The determination of the forage acre factor involves the field work for obtaining the data on the various factors, and the computations based on the data.

The following example, given by way of illustration, involves but two species. This short example is chosen for the sake of simplicity. Actually, more species are usually encountered.

Sample: Range type description sheet.
Forage density: .40.

| Species | Proper use factor (A) | Composition of each species, per cent (B) | Weighted palatability (A)×(B) |
|---|---|---|---|
| Blue grass | .80 | 30 | .24 |
| Salt grass | .20 | 70 | .14 |

Total palatability _____ .38
Forage density _____ .40

Forage acre factor _____ .15

The forage density and data in columns (A) and (B) are taken in the field. The computations involve multiplication of the factors in columns (A) and (B), addition of their products to give what is frequently termed total palatability, and multiplication of the total palatability by the forage density, to obtain the forage acre factor. These computations, although simple, are tedious, and errors are frequently made.

It is the object of this invention to provide a calculator for effecting the computations indicated above. It is further the object to provide such calculator of simple construction, easy to use, small and of light weight whereby the calculator may be carried about in the field and be used by a relatively inexperienced person, to compute rapidly and accurately the range type description sheet.

The calculator is illustrated in the attached drawings, in which.

Figure 1:
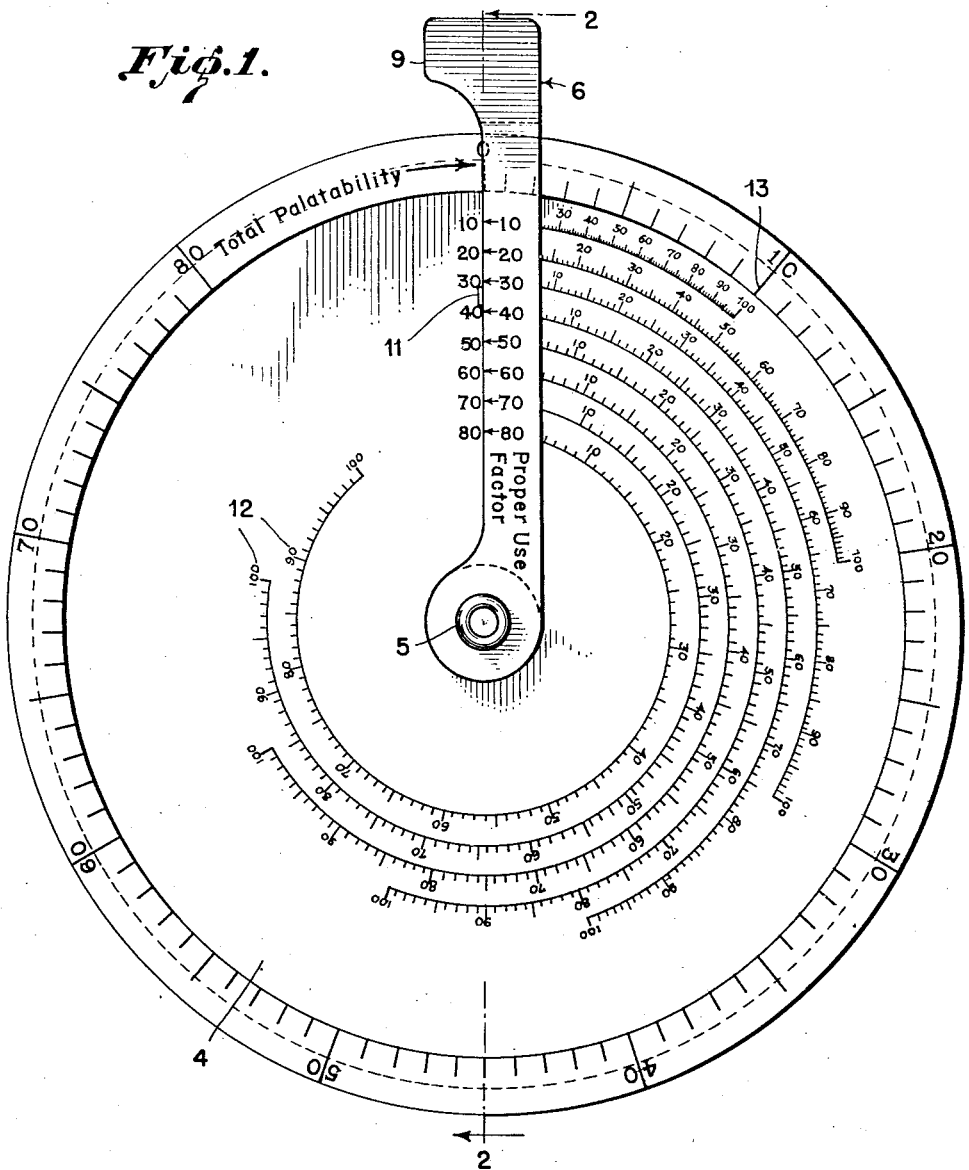
Figure 1 is a front view of the calculator.
Figure 2:
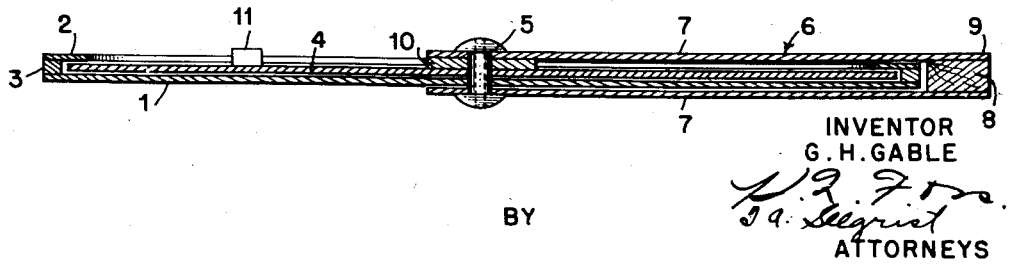
Figure 2 is a section on the line 2—2 of Figure 1.
Figure 7:
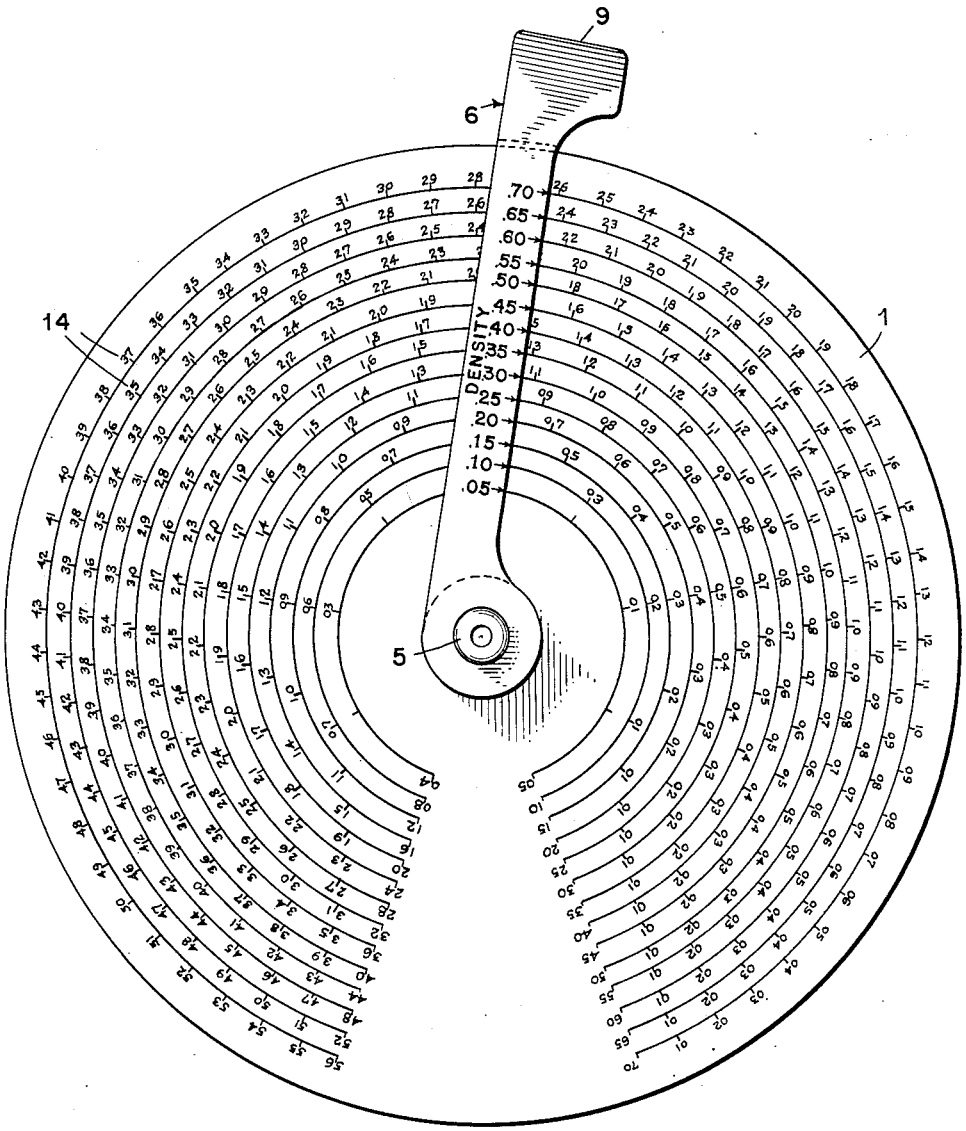
Figure 7 is a back view of the calculator comparing with Figure 1, and showing a final step in its use.

Referring to the drawings, Figures 1, 2 and 7, a foundation plate 1 is provided with a ring-shaped totaling rim 2 secured to its periphery, with a spacer 3 positioned between the outer periphery of the totaling rim and the front face of the foundation plate, allowing space between the inner periphery of the totaling rim and the foundation plate. The foundation plate is preferably a disc, but may have shapes other than circular. A rotatable plate 4 is mounted to rotate on a pivot pin 5 concentrically on the front face of the foundation plate, with its outer periphery located rearwardly of the inner periphery of the totaling rim. A cursor 6, the left hand edge of which, as viewed in Figure 1, constituting the indicator line, comprises a pair of arms 7—7 attached together and spaced apart by a block 8 at its one end. The free end of each arm is pivoted on pivot pin 5, with one arm located on each side of the foundation and rotatable plates. The attached ends of the arm and block extend beyond the periphery of the foundation plate forming a handle 9. A washer 10 spaces the front arm from the rotatable plate. The pivot pin 5 serves as a rivet to hold the parts together. The rotatable plate 4 is provided with a stop 11 positioned to engage the front arm of the cursor, for reasons which are later explained.

The front face of the rotatable plate is provided with a set of proper use factor scales 12, consisting of eight individual concentric circular scales numbered in tenths from .10 to .80, and indicated on the drawings with numerals 10, 20, and so forth, respectively, each individual scale being graduated from 0 to 1.00 with equally spaced graduations, representing composition of species graduations, and having their zero graduations positioned on the same radial line.

The totaling rim is provided with a totaling scale 13 so graduated from 0 to .80 that when it is zeroed with the proper use factor scale, that is, when the zero of the proper use factor scale is matched with the zero of the totaling scale as determined by the matching of the zeros with the cursor indicating line, the product of a proper use factor and any composition of species indicated on the respective individual proper use factor scale can be read on the totaling rim opposite the respective composition of species graduation.

The rear face of the foundation plate is provided with a set of forage acre factor scales 14, consisting of fourteen individual concentric circular scales numbered in .05 from .05 to .70, and indicated on the drawings with numerals 05, 10, and so forth, respectively, each individual scale being graduated from 0 upward with equally spaced graduations, representing forage acre factor graduations, the graduation on the larger scales being closer and extending through a wider range than those on the lower scales, as shown in Figure 7. Forage densities are only estimated to the nearest .05, and seldom go over .70; hence the number of individual forage acre factor scales is sufficient for the purpose. This scale is zeroed with the scale of the totaling rim, that is, its zero matches with the zero on the totaling rim, and is so graduated that the product of a forage density and a total on the totaling scale, i. e., the forage acre factor, falls on that respective forage density circular scale graduation opposite the total on the totaling scale.

The calculator parts can be made of any suitable material. The various scales, of course, must be clearly visible.

Figure 3:
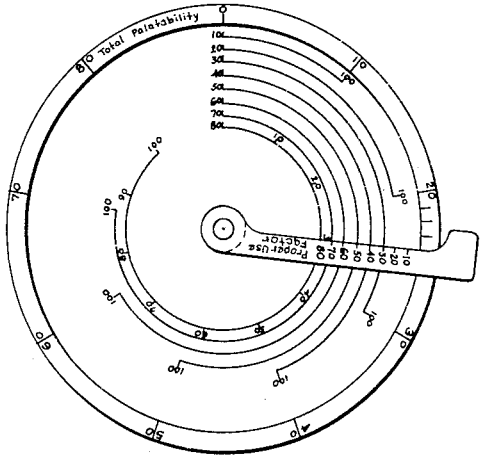
Figures 3, 4, 5 and 6 are front views corresponding to Figure 1, showing several steps in the use of the calculator.

The use of the calculator will be explained in reference to the example set forth above. The set of proper use factor scales 12 is first zeroed with the totaling scale 13 by rotation of plate 4, the setting being shown in Figure 1. The cursor 6 is then moved to .30 on the individual proper use factor scale marked "80," the rotatable plate 4 being held stationary in respect to the totaling rim, giving the setting shown in Figure 3. This gives .24 on the totaling scale as the solution of the weighted palatability for blue grass.

Figure 4:
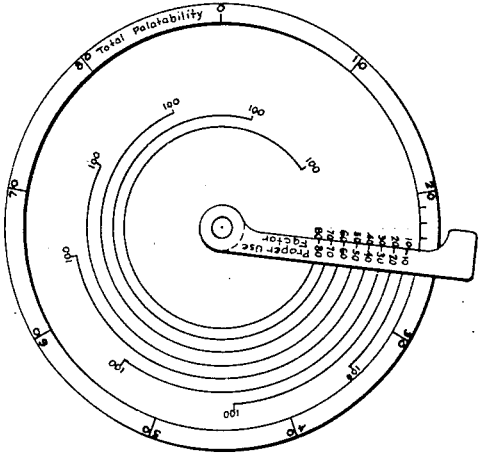
Figure 5:
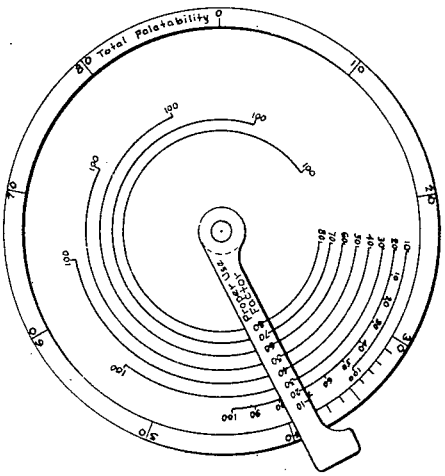

The cursor 6 is then held tightly with respect to the totaling rim, and the plate 4 is rotated clockwise until the set of proper use factor scales zeroes with the indicator line of the cursor, that is, until the zeroes of the set of proper use factor scales match with the indicator line, as shown in Figure 4. The stop 11 is so located that when it engages the front arm of the cursor the set of proper use factor scales is so zeroed. The calculator is now set ready to begin solving for the second species. The indicator line is now moved to .70 on the individual proper use factor scale marked "20," the rotatable plate being held stationary as before, giving the setting shown in Figure 5. This gives .38 on the totaling scale as the solution of the total palatability for both the blue grass and the salt grass species.

Figure 6:
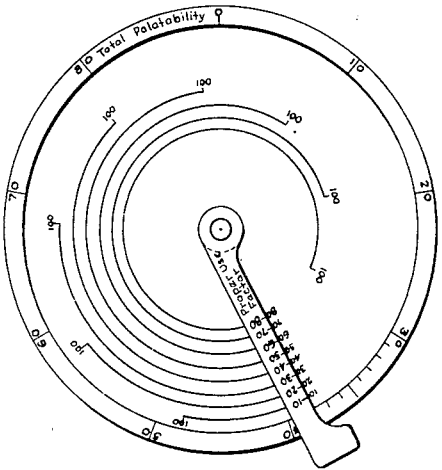

If further species are present, the process is repeated, the set of proper use factor scales being zeroed with the indicator line, in the manner shown in Figure 6 for each.

Without moving the cursor relative to the foundation plate 1, the calculator is finally turned over and the forage acre factor is read opposite the indicator line on the individual scale marked "40" of the set of forage acre factor scales, showing .15, as indicated in Figure 7.

Experience has shown that the use of this calculator greatly facilitates the computing of range type description sheets. A person familiar with the use of the calculator can compute 40 to 50 average sheets per hour, decreasing the time by more than one-half over that required to do the computing by longhand, and can do so with materially fewer errors. Furthermore, if the calculation is done in the field, as is often the practice, frequent errors occur in longhand methods, due to the distracting circumstances under which the individual works. The instrument of this invention, due to its convenient size, can be carried in the field and, since its operation becomes mechanical, its use eliminates the errors due to the adverse circumstances arising in the field.

What is claimed is:

A calculator for computing range type description sheets comprising a foundation plate, a total rim fixed to the periphery of the foundation plate, a rotatable plate mounted to rotate on the front face of the foundation plate, and a cursor having a pair of arms attached together at one end positioned one on each side of the foundation and rotatable plates and rotatably mounted thereon at the free end of one of said arms, said rotatable plate having on its front face a set of proper use factor scales comprising a plurality of individual, concentric, circular scales, one for each of several species of grasses, each of said individual scales being graduated from 0 to 1.00, representing percentage of species present in a composition of grasses and having their zero graduations positioned on the same radial line, said totaling rim having a totaling scale so graduated from zero upward that, when zeroed with the set of proper use factor scales, the product of a proper use factor and percentage of species indicated on the respective individual proper use factor scale can be read on the totaling scale opposite the respective percentage of species graduation, said foundation plate having on its rear face a set of forage acre factor scales comprising a plurality of individual, concentric, circular scales, each zeroed with the totaling scale, each representing a different percentage of forage density and so graduated that the product of a selected percentage of forage density and a total on the totaling scale, i. e., the forage acre factor, falls on the respective forage density circular scale graduation opposite the total on the totaling scale.

GEORGE H. GABLE.